(12) United States Patent
Okumura (10) Patent No.: US 12,163,653 B2
(45) Date of Patent: Dec. 10, 2024

(54) DECORATIVE SHEET AND INTERIOR MEMBER

(71) Applicants: TOKAI CHEMICAL INDUSTRIES, LTD., Gifu (JP); Sumitomo Riko Company Limited, Aichi (JP)

(72) Inventor: Takemasa Okumura, Aichi (JP)

(73) Assignees: TOKAI CHEMICAL INDUSTRIES, LTD., Gifu (JP); Sumitomo Riko Company Limited, Aichi (JP)

(*) Notice: Subject to any disclaimer, the term of this patent is extended or adjusted under 35 U.S.C. 154(b) by 0 days.

(21) Appl. No.: 18/608,866

(22) Filed: Mar. 18, 2024

(65) Prior Publication Data

US 2024/0219000 A1    Jul. 4, 2024

Related U.S. Application Data

(63) Continuation of application No. PCT/JP2023/012030, filed on Mar. 24, 2023.

(30) Foreign Application Priority Data

Mar. 30, 2022 (JP) .................. 2022-057113

(51) Int. Cl.
*F21V 3/00* (2015.01)
*B60K 35/40* (2024.01)
(Continued)

(52) U.S. Cl.
CPC .............. *F21V 3/00* (2013.01); *B60K 35/40* (2024.01); *B60Q 3/66* (2017.02); *B60R 13/02* (2013.01);
(Continued)

(58) Field of Classification Search
CPC .................. B60A 3/66; B60A 2500/30; B60K 2360/33; B60K 2360/339; B60K 2360/34; F21Y 2113/13; F21W 2160/00
(Continued)

(56) References Cited

U.S. PATENT DOCUMENTS

2020/0338793 A1  10/2020 Ito et al.
2023/0244348 A1  8/2023 Yabuki
(Continued)

FOREIGN PATENT DOCUMENTS

JP    S4856989    7/1973
JP    S565175     1/1981
(Continued)

OTHER PUBLICATIONS

"International Search Report (Form PCT/ISA/210) of PCT/JP2023/012030", mailed on Apr. 25, 2023, with English translation thereof, pp. 1-6.

*Primary Examiner* — Laura K Tso
(74) *Attorney, Agent, or Firm* — JCIPRNET (57) ABSTRACT

A decorative sheet includes, from the front side to the back side, a skin layer, an intermediate layer, a design layer, and a soft layer. Recesses open on at least one of a front surface and a back surface of the design layer. The decorative sheet further includes display regions formed by the recesses. The display regions display a predetermined design on a front surface of the skin layer by light irradiated from the back side. Light is irradiated from the back side to the display regions via the soft layer. Light blocking partition parts of the soft layer are each disposed between two adjacent display regions as seen from the front side, and prevent light to be irradiated to one display region from leaking into the other display region via the soft layer.

14 Claims, 8 Drawing Sheets

(51) Int. Cl.
  *B60Q 3/66* (2017.01)
  *B60R 13/02* (2006.01)
  *F21W 106/00* (2018.01)
  *F21W 121/00* (2006.01)
  *F21Y 113/13* (2016.01)

(52) U.S. Cl.
  CPC ...... *B60K 2360/16* (2024.01); *B60K 2360/33* (2024.01); *B60K 2360/339* (2024.01); *B60K 2360/34* (2024.01); *B60K 2360/77* (2024.01); *B60Q 2500/30* (2022.05); *B60R 2013/0287* (2013.01); *F21W 2106/00* (2018.01); *F21W 2121/00* (2013.01); *F21Y 2113/13* (2016.08)

(58) Field of Classification Search
  USPC .................................................. 362/509, 488
  See application file for complete search history.

(56) References Cited

U.S. PATENT DOCUMENTS

2023/0347740 A1* 11/2023 Kontani ................. B60K 35/00
2024/0220030 A1* 7/2024 Okumura ............. G06F 3/0202

FOREIGN PATENT DOCUMENTS

| JP | S56143873 | 10/1981 |
| JP | H0262586 | 5/1990 |
| JP | 2013088760 | 5/2013 |
| JP | 6663088 | 3/2020 |
| WO | 2019225140 | 11/2019 |
| WO | 2022113457 | 6/2022 |

* cited by examiner

DECORATIVE SHEET AND INTERIOR MEMBER

CROSS-REFERENCE TO RELATED APPLICATION

This application is a continuation of PCT International Application No. PCT/JP2023/012030, filed on Mar. 24, 2023, which claims priority under 35 U.S.C § 119(a) to Japanese Patent Application No. 2022-057113, filed on Mar. 30, 2022. Each of the above application(s) is hereby expressly incorporated by reference, in its entirety, into the present application.

BACKGROUND

Technical Field

The present disclosure relates to a decorative sheet and an interior member used in, for example, an interior part of a vehicle.

Related Art

In the field of vehicle interiors, the development of decorative sheets having a surface on which a design (such as a letter or a pattern) can be displayed using backlighting is progressing. Some decorative sheets may be able to selectively display an arbitrary design from among a plurality of designs. In such a decorative sheet, light leakage becomes a problem. Specifically, on the back side of the plurality of designs, a plurality of light sources are disposed corresponding to each design. When displaying an arbitrary design, there is a problem that the light for the design to be displayed may go around to behind a design not to be displayed, and said design may also be displayed.

In this regard, Patent Document 1 (International Publication No. 2019/225140) discloses a dot matrix display device in which light leakage can be suppressed. The dot matrix display device of Patent Document 1 includes, from the front side to the back side, a surface material, a flexible layer, a plurality of LEDs and light blocking walls, and a circuit board. The light blocking walls partition the circuit board into a grid pattern. The plurality of LEDs are assigned to a plurality of regions obtained by partitioning by the light blocking walls. When an arbitrary single LED is focused, said LED is surrounded by the light blocking walls from all sides. Hence, the light of said LED can be prevented from being irradiated onto a design for the other LEDs. That is, light leakage can be suppressed.

In the case of the dot matrix display device of Patent Document 1, both the LED and the light blocking wall are disposed on the back side of the flexible layer. Hence, it is difficult to control the light that has entered the flexible layer from the LED. That is, it is difficult to suppress light leakage caused by light diffusion in the flexible layer. Accordingly, the present disclosure provides a decorative sheet and an interior member in which light leakage caused by light diffusion in the flexible layer can be suppressed.

SUMMARY

A decorative sheet of the present disclosure includes: a skin layer, having a light transmitting property; an intermediate layer, disposed on a back side of the skin layer and having a lower light transmitting property than the skin layer; a design layer, disposed on the back side of the intermediate layer and having a lower light transmitting property than the intermediate layer; a recess, opening on at least one of a front surface and a back surface of the design layer; and a soft layer, disposed on the back side of the design layer and having a light diffusing property. The decorative sheet further includes a plurality of display regions formed by the recess and displaying a predetermined design on a front surface of the skin layer by light irradiated from the back side. The plurality of display regions are each irradiated with light from the back side via the soft layer. The soft layer includes a main body, and a light blocking partition part disposed in the main body and having a higher light blocking property than the main body. The light blocking partition part is disposed between two adjacent ones of the display regions as seen from a front side, and prevents light to be irradiated to one of the display regions from leaking into the other of the display regions via the soft layer.

An interior member of the present disclosure includes: the decorative sheet; a base material, disposed on the back side of the soft layer and having a light transmitting property; a light source part, irradiating light to the plurality of display regions via the base material and the soft layer; and a control part, controlling the light source part.

DESCRIPTION OF THE EMBODIMENTS

The soft layer of the decorative sheet and the interior member of the present disclosure includes the light blocking partition part. The light blocking partition part is disposed between two adjacent display regions as seen from the front side. The light blocking partition part is able to prevent the light to be irradiated to one display region from leaking into the other display region via the soft layer. Hence, light leakage caused by light diffusion in the soft layer can be suppressed.

Hereinafter, embodiments of a decorative sheet and an interior member of the present disclosure will be described.

First Embodiment

[Arrangement and Configuration of Interior Member]

Figure 1:
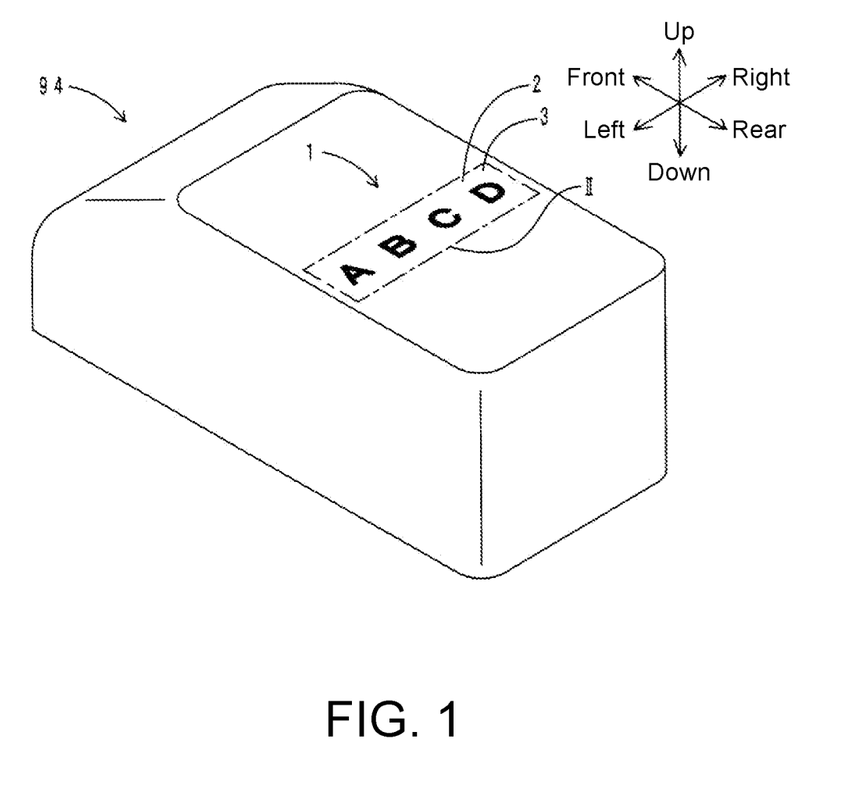
FIG. 1 is a layout diagram of an interior member of a first embodiment.
Figure 2:
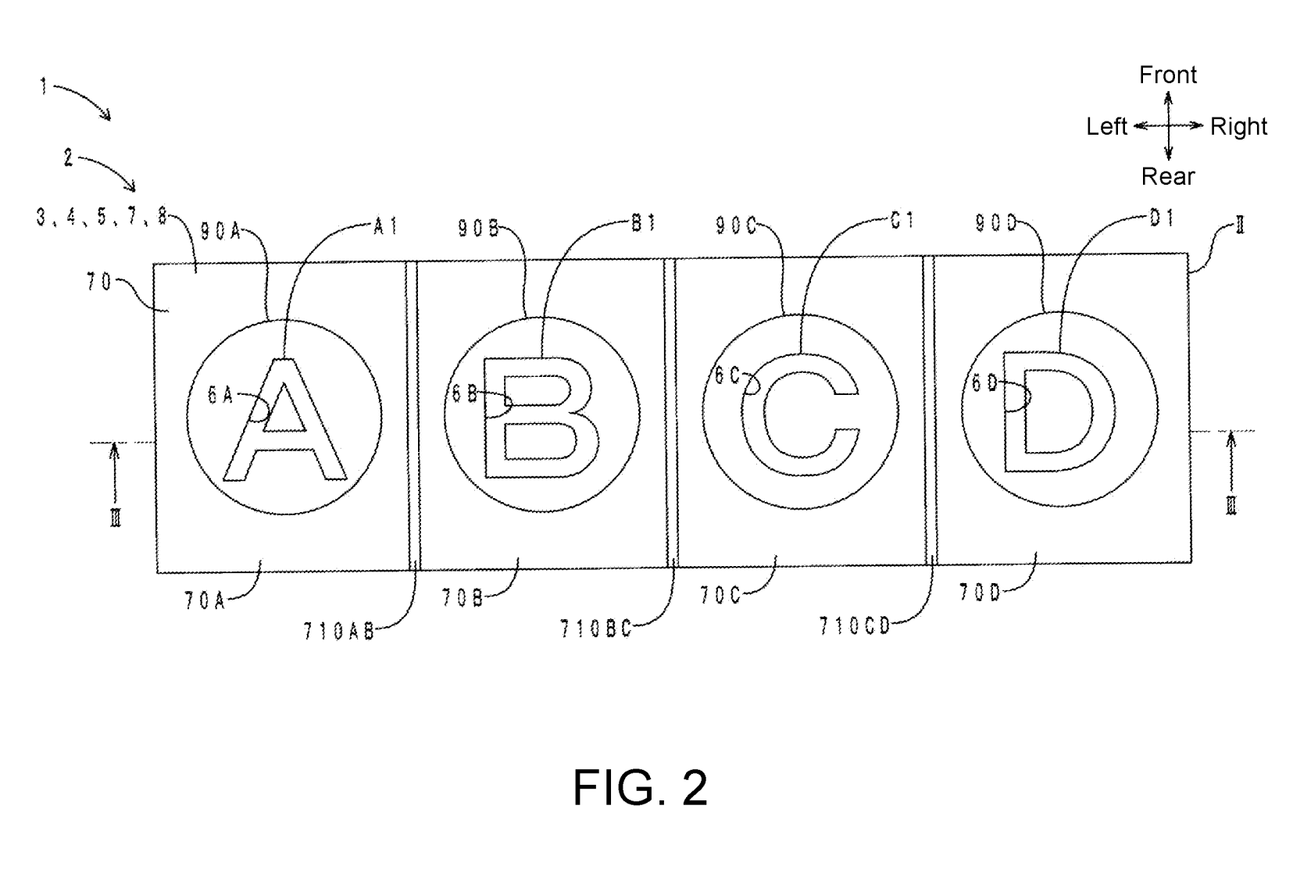
FIG. 2 is a transparent top view within a frame II of FIG. 1.
Figure 3:
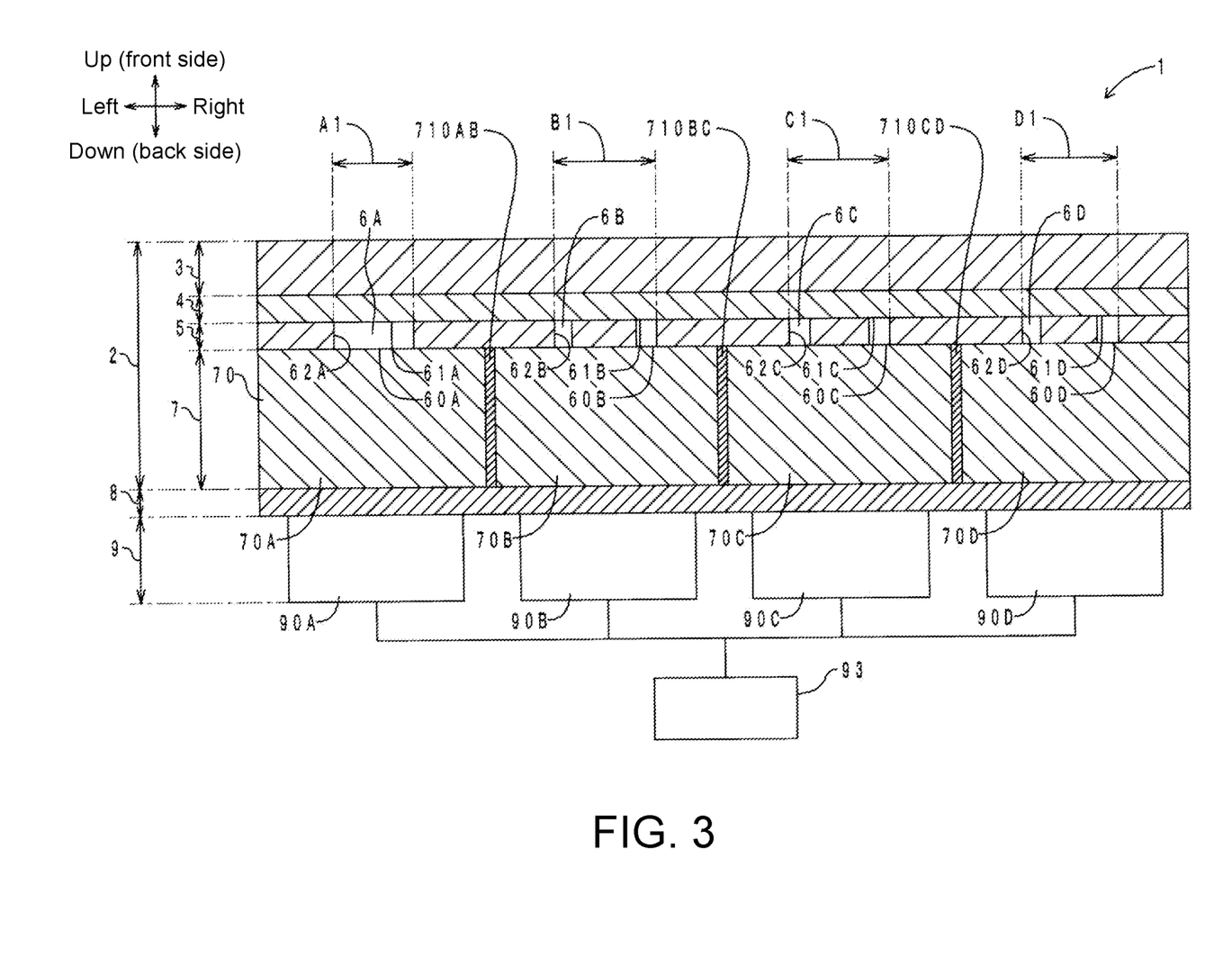
FIG. 3 is a cross-sectional view taken along III-III of FIG. 2.

First, an arrangement and a configuration of an interior member of the present embodiment are described. FIG. 1 shows a layout diagram of the interior member of the present embodiment. FIG. 2 shows a transparent top view (transparent front view) within a frame II of FIG. 1. FIG. 3 shows a cross-sectional view taken along III-III of FIG. 2. In FIG.

2, for convenience of description of a positional relationship between each member, display regions A1 to D1, light sources 90A to 90D and so on are shown as seen through a skin layer 3 and so on.

As shown in FIG. 1, an interior member 1 is disposed in a console box (interior part) 94 in a vehicle interior. That is, the interior member 1 is an interior member for vehicles. As shown in FIG. 2 and FIG. 3, the interior member 1 includes a decorative sheet 2, a base material 8, a light source part 9, and a control part 93. The decorative sheet 2, the base material 8, and the light source part 9 are laminated in this order from a front side (upper side; inside of the vehicle interior) to a back side (lower side; outside of the vehicle interior). The control part 93 is electrically connected to the light source part 9.

(Decorative Sheet 2)

The decorative sheet 2 includes, from the front side to the back side, the skin layer 3, an intermediate layer 4, a design layer 5, and a soft layer 7. As shown in FIG. 1 and FIG. 2, a front surface (upper surface) of the skin layer 3 is exposed to the vehicle interior. The skin layer 3 is made of synthetic leather and is layered. The skin layer 3 has a light transmitting property and flexibility.

The intermediate layer 4 is disposed on the back side of the skin layer 3. The intermediate layer 4 is made of light transmitting ink and is layered. The intermediate layer 4 has a light transmitting property and flexibility. The intermediate layer 4 has a lower light transmitting property than the skin layer 3. That is, the intermediate layer 4 is semitransparent with a smoky tone. The intermediate layer 4 is colored transparent.

The design layer 5 is disposed on the back side of the intermediate layer 4. The design layer 5 is made of light non-transmitting ink and is layered. The design layer 5 has a light non-transmitting property and flexibility. In the design layer 5, four recesses 6A to 6D are disposed. The design layer 5 (excluding portions where the recesses 6A to 6D are disposed) does not transmit light. The design layer 5 is irradiated with light from the back side via the soft layer 7 to be described later.

The recesses 6A to 6D open on a front surface and a back surface of the design layer 5. That is, the recesses 6A to 6D penetrate the design layer 5 in a front-back direction (up-down direction). Provided inside the recesses 6A to 6D is a space. The recess 6A includes an opening 60A, a bottom 61A, and a lateral surface 62A. The opening 60A opens on the back surface of the design layer 5. The bottom 61A is disposed on a back surface of the intermediate layer 4. The bottom 61A and the opening 60A face each other in the front-back direction. The lateral surface 62A connects the opening 60A and the bottom 61A. The lateral surface 62A extends in a plane normal direction (front-back direction; up-down direction) of a front surface of the skin layer 3. Like the recess 6A, the recesses 6B to 6D include openings 60B to 60D, bottoms 61B to 61D, and lateral surfaces 62B to 62D.

The recesses 6A to 6D set the display regions A1 to D1 in the decorative sheet 2. As shown in FIG. 2, as seen from the front side, a letter "A" is formed in the display region A1 (recess 6A), a letter "B" is formed in the display region B1 (recess 6B), a letter "C" is formed in the display region C1 (recess 6C), and a letter "D" is formed in the display region D1 (recess 6D). In the decorative sheet 2, portions where the display regions A1 to D1 (recesses 6A to 6D) are set have a smaller thickness in the front-back direction than the other portions. Hence, light is likely to be transmitted therethrough. As shown in black in FIG. 1, by the light irradiated from the back side, the display regions A1 to D1 display the predetermined designs "A" to "D" on the front surface of the skin layer 3, that is, the decorative sheet 2.

The soft layer 7 is disposed on the back side of the design layer 5. The soft layer 7 includes a main body 70 and three partition plates 710AB to 710CD. The main body 70 is made of thermoplastic elastomer foam. The main body 70 is layered and has flexibility, a light transmitting property, and a light diffusing property. The main body 70 includes four (same number as the display regions A1 to D1) blocks 70A to 70D. The blocks 70A to 70D are disposed side by side in a plane direction (left-right direction; direction intersecting (orthogonal to) the front-back direction).

The three partition plates 710AB to 710CD each have a higher light blocking property than the main body 70. The partition plate 710AB is buried between the block 70A and the block 70B. The partition plate 710AB provides a partition between the block 70A and the block 70B. The partition plate 710BC is buried between the block 70B and the block 70C. The partition plate 710BC provides a partition between the block 70B and the block 70C. The partition plate 710CD is buried between the block 70C and the block 70D. The partition plate 710CD provides a partition between the block 70C and the block 70D.

As shown in FIG. 2, as seen from the front side, the partition plate 710AB is disposed between two display regions A1 and B1 that are adjacent to each other in the plane direction, the partition plate 710BC is disposed between two display regions B1 and C1 that are adjacent to each other in the plane direction, and the partition plate 710CD is disposed between two display regions C1 and D1 that are adjacent to each other in the plane direction.

(Base Material 8, Light Source Part 9, and Control Part 93)

As shown in FIG. 3, the base material 8 is disposed on the back side of the soft layer 7. The base material 8 is made of resin and is layered. The base material 8 has a light transmitting property and flexibility. The light source part 9 is disposed on the back side of the base material 8. As shown in FIG. 2 and FIG. 3, the light source part 9 includes four light sources (LEDs) 90A to 90D. Front surfaces of the light sources 90A to 90D are each able to emit light over the entire surface. An irradiation target of the light from the light source 90A is the display region A1. An irradiation target of the light from the light source 90B is the display region B1. An irradiation target of the light from the light source 90C is the display region C1. An irradiation target of the light from the light source 90D is the display region D1.

The control part 93 is disposed on the back side of the console box 94 shown in FIG. 1 so as not to be visually recognized from inside of the vehicle interior. The control part 93 includes a processing unit (CPU) and a storage device (RAM, ROM) that are not illustrated. The control part 93 is able to control (such as control turn-on and turn-off and control dimming) the light sources 90A to 90D.

[Usage of Interior Member]

Next, a usage of the interior member of the present embodiment is described. As shown in FIG. 3, in the case where the control part 93 turns off the light sources 90A to 90D, the light sources 90A to 90D do not emit light. The intermediate layer 4 has a lower light transmitting property than the skin layer 3. Hence, a user is unlikely to visually recognize the design layer 5 from the front side (inside of the vehicle interior) of the decorative sheet 2.

For example, when causing only the design "A" among the designs "A" to "D" shown in FIG. 1 to be displayed on the front surface of the skin layer 3, the control part 93 turns on only the light source 90A. The light from the light source 90A enters the block 70A of the soft layer 7 via the base material 8. Here, in the soft layer 7, the partition plates 710AB to 710CD are disposed. Hence, the light from the light source 90A can be prevented from being diffused from the block 70A to the blocks 70B to 70D. Accordingly, the light from the light source 90A can be irradiated only to the display region A1 via the block 70A. Thus, it is possible to cause only the design "A" to be displayed on the front surface of the skin layer 3. The partition plates 710AB to 710CD are able to prevent the diffusion of light from the light sources 90B to 90D as well as the diffusion of light from the light source 90A.

[Effects]

Next, effects of the interior member of the present embodiment are described. As shown in FIG. 2 and FIG. 3, the soft layer 7 of the decorative sheet 2 includes the partition plates 710AB to 710CD. The partition plate 710AB is able to prevent the light to be irradiated to one of two display regions A1 and B1 adjacent to each other with the partition plate 710AB therebetween as seen from the front side, namely the display region A1, from leaking via the soft layer 7 into the other display region, namely the display region B1. Also, the partition plate 710AB is able to prevent the light to be irradiated to one display region, namely the display region B1, from leaking via the soft layer 7 into the other display region, namely the display region A1. The same applies to the other partition plates 710BC to 710CD. Hence, light leakage caused by light diffusion in the soft layer 7 can be suppressed.

The light sources 90A to 90D are LEDs. Hence, the light from the light sources 90A to 90D has high straightness (directionality). Accordingly, it is possible to prevent the light from the light source 90A from leaking into the display regions B1 to D1 not being irradiation targets besides the display region A1 being an irradiation target. The same applies to the light from the other light sources 90B to 90D.

Second Embodiment

An interior member of the present embodiment differs from the interior member of the first embodiment in that a paint impregnation partition part is disposed instead of a partition plate, and that an intermediate layer reaching part is disposed at a bottom of a recess. Here, only the differences will be described.

Figure 4:
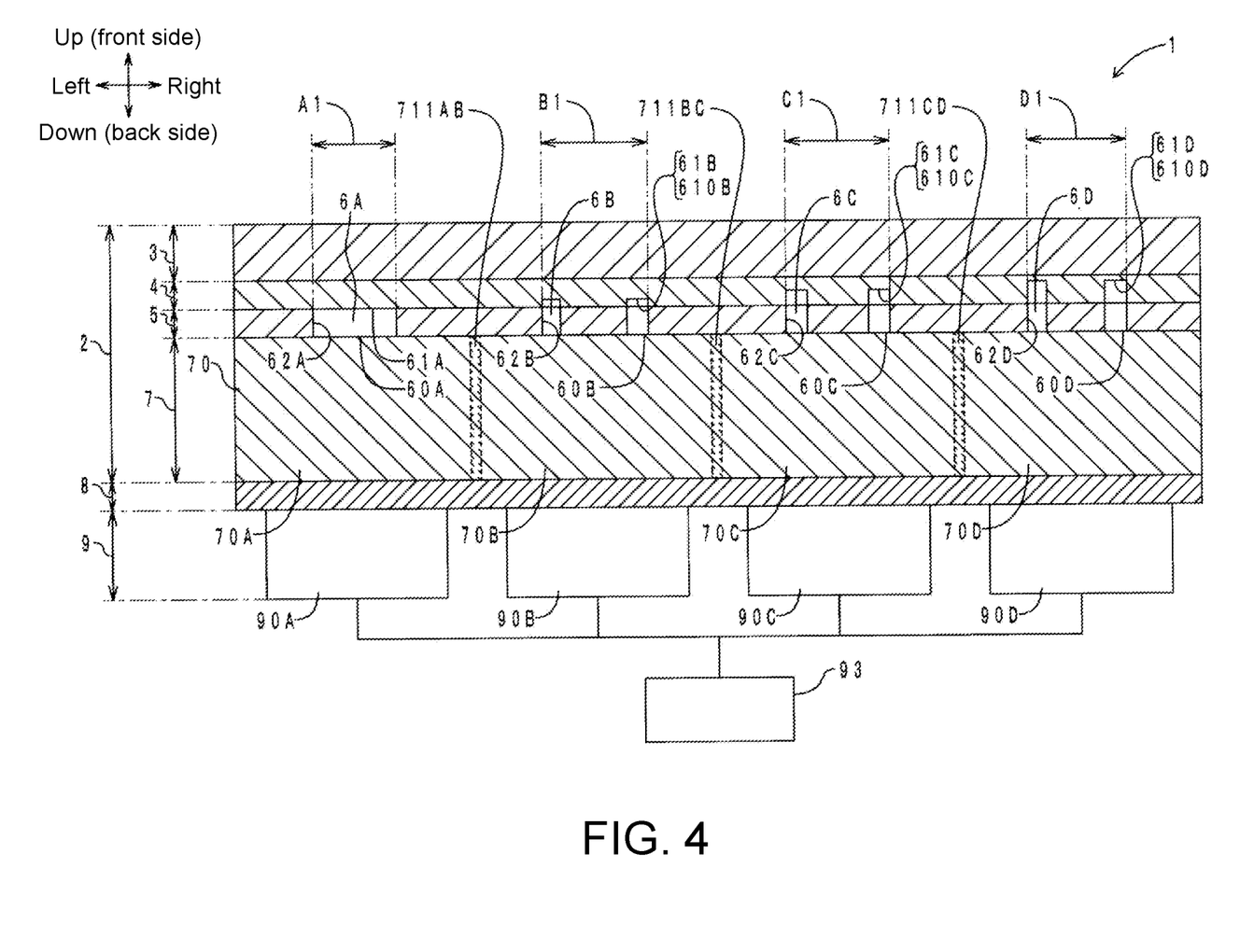
FIG. 4 is a cross-sectional view in a front-back direction of an interior member of a second embodiment.

FIG. 4 is a cross-sectional view in the front-back direction of the interior member of the present embodiment. Portions corresponding to those in FIG. 3 are denoted by the same reference numerals. As shown in FIG. 4, the soft layer 7 includes three paint impregnation partition parts 711AB to 711CD. The three paint impregnation partition parts 711AB to 711CD each have a higher light blocking property than the main body 70. The paint impregnation partition parts 711AB to 711CD are made of, for example, foam (foam forming the main body 70) impregnated with a white paint (light shielding agent (light reflecting agent) such as titanium oxide) or a black paint (light absorbing agent such as titanium black or carbon black). The white paint and the black paint are included in the concept of "light blocking paint" of the present disclosure.

An intermediate layer reaching part 610B is disposed in the entire bottom 61B of the recess 6B, an intermediate layer reaching part 610C is disposed in the entire bottom 61C of the recess 6C, and an intermediate layer reaching part 610D is disposed in the entire bottom 61D of the recess 6D. The intermediate layer reaching parts 610B to 610D are each disposed within the intermediate layer 4. The intermediate layer reaching part 610B is disposed near the back surface of the intermediate layer 4, the intermediate layer reaching part 610D is disposed near the front surface of the intermediate layer 4, and the intermediate layer reaching part 610C is disposed in the middle between the intermediate layer reaching part 610B and the intermediate layer reaching part 610D. No intermediate layer reaching part is disposed at the bottom 61A of the recess 6A. That is, the recess 6A does not reach within the intermediate layer 4.

By comparison of the recesses 6A to 6D in terms of depth in the front-back direction (depth in the front-back direction from the openings 60A to 60D), the depth increases in the order of the recess 6A (shallowest)→the recess 6B→the recess 6C→the recess 6D (deepest). Hence, when the control part 93 turns on the light sources 90A to 90D under the same conditions, the brightness increases in the order of the display region A1 (darkest)→the display region B1→the display region C1→the display region D1 (brightest). That is, the brightness increases in the order of the design "A"→the design "B"→the design "C"→the design "D" (see FIG. 1).

The interior member of the present embodiment and the interior member of the first embodiment have similar effects with respect to portions having common configurations. In the case where the paint impregnation partition parts 711AB to 711CD are made of foam impregnated with a white paint, the paint impregnation partition parts 711AB to 711CD are able to reflect light. By using said light reflection, the paint impregnation partition part 711AB is able to prevent the light to be irradiated to one of two display regions A1 and B1 adjacent to each other with the paint impregnation partition part 711AB therebetween as seen from the front side, namely the display region A1, from leaking via the soft layer 7 into the other display region, namely the display region B1. Also, the paint impregnation partition part 711AB is able to prevent the light to be irradiated to one display region, namely the display region B1, from leaking via the soft layer 7 into the other display region, namely the display region A1. The same applies to the other paint impregnation partition parts 711BC to 711CD. Accordingly, light leakage caused by light diffusion in the soft layer 7 can be suppressed.

In the case where the paint impregnation partition parts 711AB to 711CD are made of foam impregnated with a black paint, the paint impregnation partition parts 711AB to 711CD are able to absorb light. By using said light absorption, the paint impregnation partition part 711AB is able to prevent the light to be irradiated to one of two display regions A1 and B1 adjacent to each other with the paint impregnation partition part 711AB therebetween as seen from the front side, namely the display region A1, from leaking via the soft layer 7 into the other display region, namely the display region B1. Also, the paint impregnation partition part 711AB is able to prevent the light to be irradiated to one display region, namely the display region B1, from leaking via the soft layer 7 into the other display region, namely the display region A1. The same applies to the other paint impregnation partition parts 711BC to 711CD. Accordingly, light leakage caused by light diffusion in the soft layer 7 can be suppressed.

According to the interior member of the present embodiment, by partially impregnating the soft layer 7 with a black paint or a white paint, the paint impregnation partition parts 711AB to 711CD can be easily formed. The main body 70 and the paint impregnation partition parts 711AB to 711CD can be integrally formed.

According to the interior member 1 of the present embodiment, according to the presence or absence of the intermediate layer reaching parts 610B to 610D and the position in the front-back direction of the intermediate layer reaching parts 610B to 610D, a difference can be set in light transmittance between the display regions A1 to D1. A light transmittance t of the display regions A1 to D1 is calculated by "τ=I/I0", where the intensity of incident light entering the decorative sheet 2 is I0, and the intensity of transmitted light exiting the decorative sheet 2 is I.

Third Embodiment

An interior member of the present embodiment differs from the interior member of the first embodiment in that a slit is disposed instead of a partition plate, and that an inclined part is disposed on a lateral surface of a recess. Here, only the differences will be described.

Figure 5:
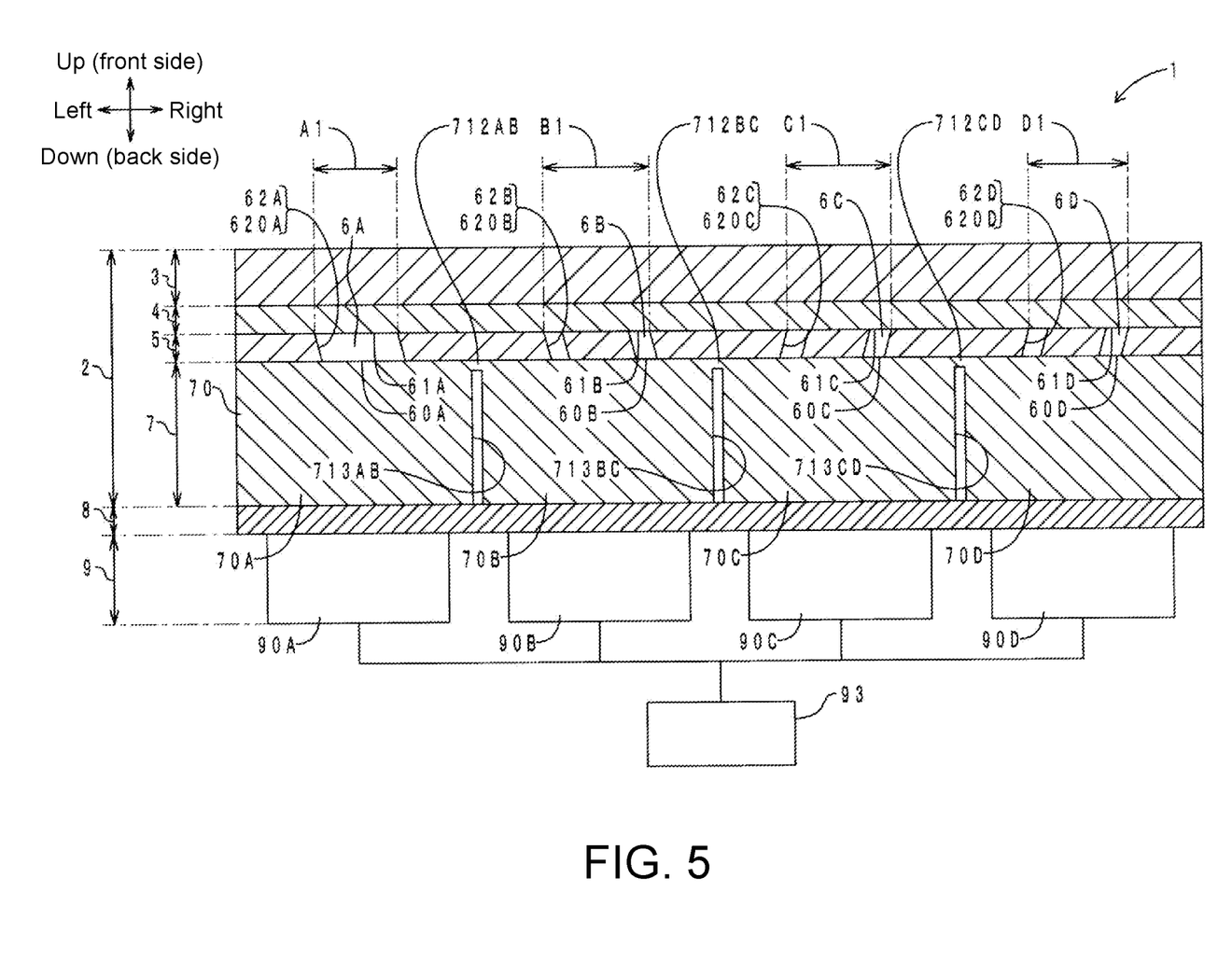
FIG. 5 is a cross-sectional view in the front-back direction of an interior member of a third embodiment.

FIG. 5 is a cross-sectional view in the front-back direction of the interior member of the present embodiment. Portions corresponding to those in FIG. 3 are denoted by the same reference numerals. As shown in FIG. 5, the soft layer 7 includes three fused parts 712AB to 712CD and three slits 713AB to 713CD. The fused parts 712AB to 712CD are each formed by partial thermal fusion of the soft layer 7. The fused part 712AB is formed between an upper end (end on the front side) of the block 70A and an upper end of the block 70B. The fused part 712BC is formed between the upper end of the block 70B and an upper end of the block 70C. The fused part 712CD is formed between the upper end of the block 70C and an upper end of the block 70D.

The slit 713AB is disposed on the back side of the fused part 712AB, the slit 713BC is disposed on the back side of the fused part 712BC, and the slit 713CD is disposed on the back side of the fused part 712CD. The slits 713AB to 713CD each open on a back surface of the soft layer 7.

An inclined part 620A is disposed on the entire lateral surface 62A of the recess 6A, an inclined part 620B is disposed on the entire lateral surface 62B of the recess 6B, an inclined part 620C is disposed on the entire lateral surface 62C of the recess 6C, and an inclined part 620D is disposed on the entire lateral surface 62D of the recess 6D. The inclined parts 620A to 620D each extend in a direction intersecting the plane normal direction of the front surface of the skin layer 3.

The interior member of the present embodiment and the interior member of the first embodiment have similar effects with respect to portions having common configurations. According to the interior member 1 of the present embodiment, the slits 713AB to 713CD can be easily disposed by partial thermal fusion of the soft layer 7. The slits 713AB to 713CD may be disposed by partially cutting the soft layer 7.

Light traveling within the soft layer 7 is reflected by the slits 713AB to 713CD. By using said reflection, the slit 713AB is able to prevent the light to be irradiated to one of two display regions A1 and B1 adjacent to each other with the slit 713AB therebetween as seen from the front side, namely the display region A1, from leaking via the soft layer 7 into the other display region, namely the display region B1. Also, the slit 713AB is able to prevent the light to be irradiated to one display region, namely the display region B1, from leaking via the soft layer 7 into the other display region, namely the display region A1. The same applies to the other slits 713BC to 713CD. Accordingly, light leakage caused by light diffusion in the soft layer 7 can be suppressed.

The inclined parts 620A to 620D are disposed on the lateral surfaces 62A to 62D of the recesses 6A to 6D. The inclined parts 620A to 620D extend in the direction intersecting the plane normal direction of the front surface of the skin layer 3. Hence, when light traveling through the recesses 6A to 6D in the plane normal direction enters the inclined parts 620A to 620D, at least a portion of the light may be reflected. At least a portion of the light may be refracted. By using said reflection or refraction, an appearance of a design displayed on the front surface of the decorative sheet 2 can be adjusted.

Fourth Embodiment

An interior member of the present embodiment differs from the interior member of the first embodiment in that a space is disposed instead of a partition plate, and that a base bottom and a deep bottom are disposed at a bottom of a recess. Here, only the differences will be described.

Figure 6:
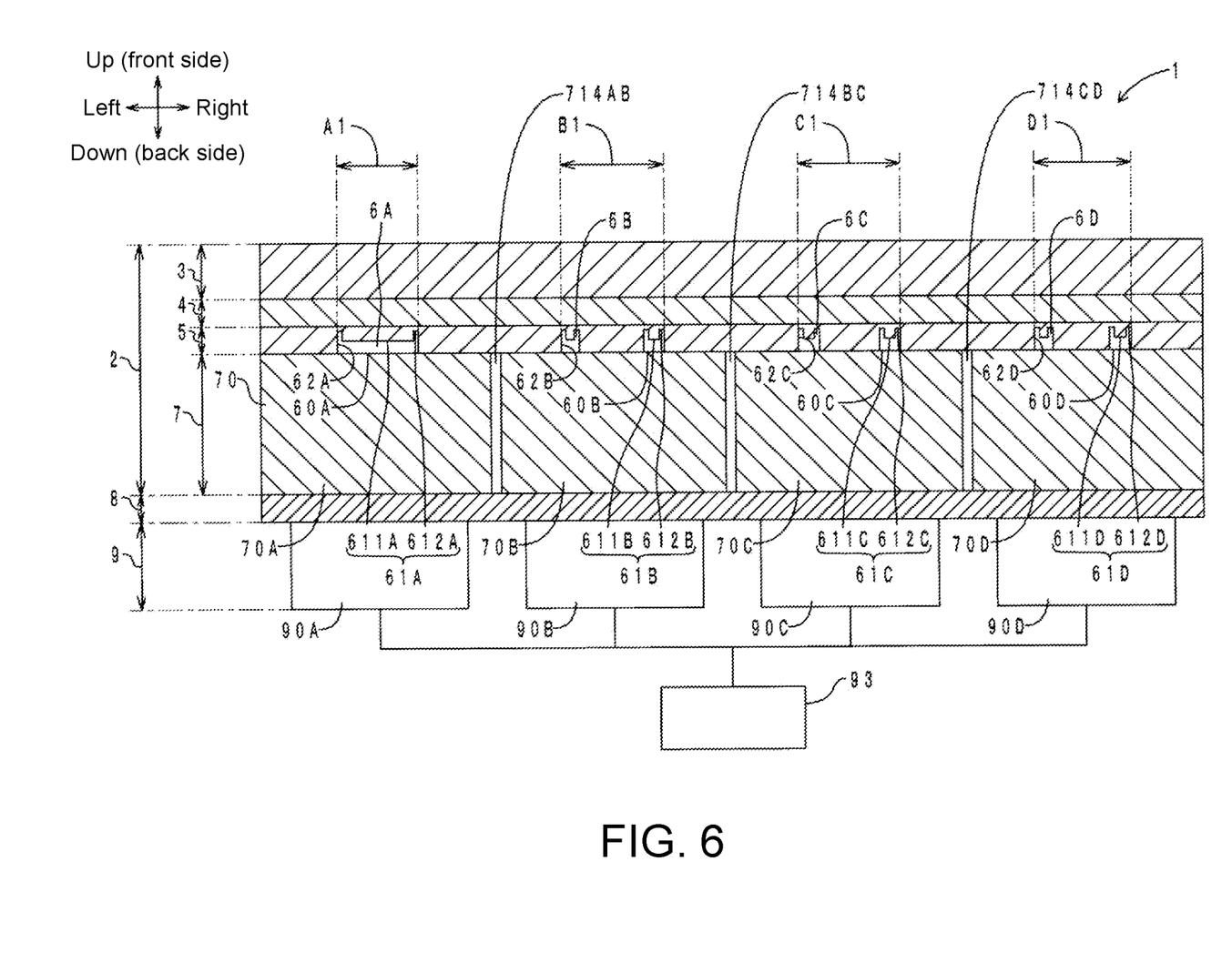
FIG. 6 is a cross-sectional view in the front-back direction of an interior member of a fourth embodiment.

FIG. 6 is a cross-sectional view in the front-back direction of the interior member of the present embodiment. Portions corresponding to those in FIG. 3 are denoted by the same reference numerals. As shown in FIG. 6, the soft layer 7 includes three spaces 714AB to 714CD. The space 714AB is interposed between the block 70A and the block 70B. The space 714BC is interposed between the block 70B and the block 70C. The space 714CD is interposed between the block 70C and the block 70D.

The design layer 5 is made of light transmitting ink. The design layer 5 has a light transmitting property. The bottoms 61A to 61D of the recesses 6A to 6D include base bottoms 611A to 611D and deep bottoms 612A to 612D. The deep bottoms 612A to 612D have a larger depth in the front-back direction than the base bottoms 611A to 611D. Hence, when the control part 93 turns on the light sources 90A to 90D, among the display regions A1 to D1, the portion corresponding to the deep bottoms 612A to 612D is brighter than the portion corresponding to the base bottoms 611A to 611D. That is, an outer edge of the designs "A", "B", "C", and "D" (see FIG. 1) is brighter than the inside, as if the designs were outlined.

The interior member of the present embodiment and the interior member of the first embodiment have similar effects with respect to portions having common configurations. According to the interior member 1 of the present embodiment, the spaces 714AB to 714CD can be easily set by arranging the blocks 70A to 70D at predetermined intervals. The light traveling within the soft layer 7 is reflected by the spaces 714AB to 714CD. By using said reflection, the space 714AB is able to prevent the light to be irradiated to one of two display regions A1 and B1 adjacent to each other with the space 714AB therebetween as seen from the front side, namely the display region A1, from leaking via the soft layer 7 into the other display region, namely the display region B1. Also, the space 714AB is able to prevent the light to be irradiated to one display region, namely the display region B1, from leaking via the soft layer 7 into the other display region, namely the display region A1. The same applies to the other spaces 714BC to 714CD. Accordingly, light leakage caused by light diffusion in the soft layer 7 can be suppressed.

According to the interior member 1 of the present embodiment, the bottoms 61A to 61D include the base bottoms 611A to 611D and the deep bottoms 612A to 612D. That is, a step is set in each of the bottoms 61A to 61D.

Hence, a difference can be set in the light transmittance between the display regions A1 to D1.

Fifth Embodiment

Figure 7:
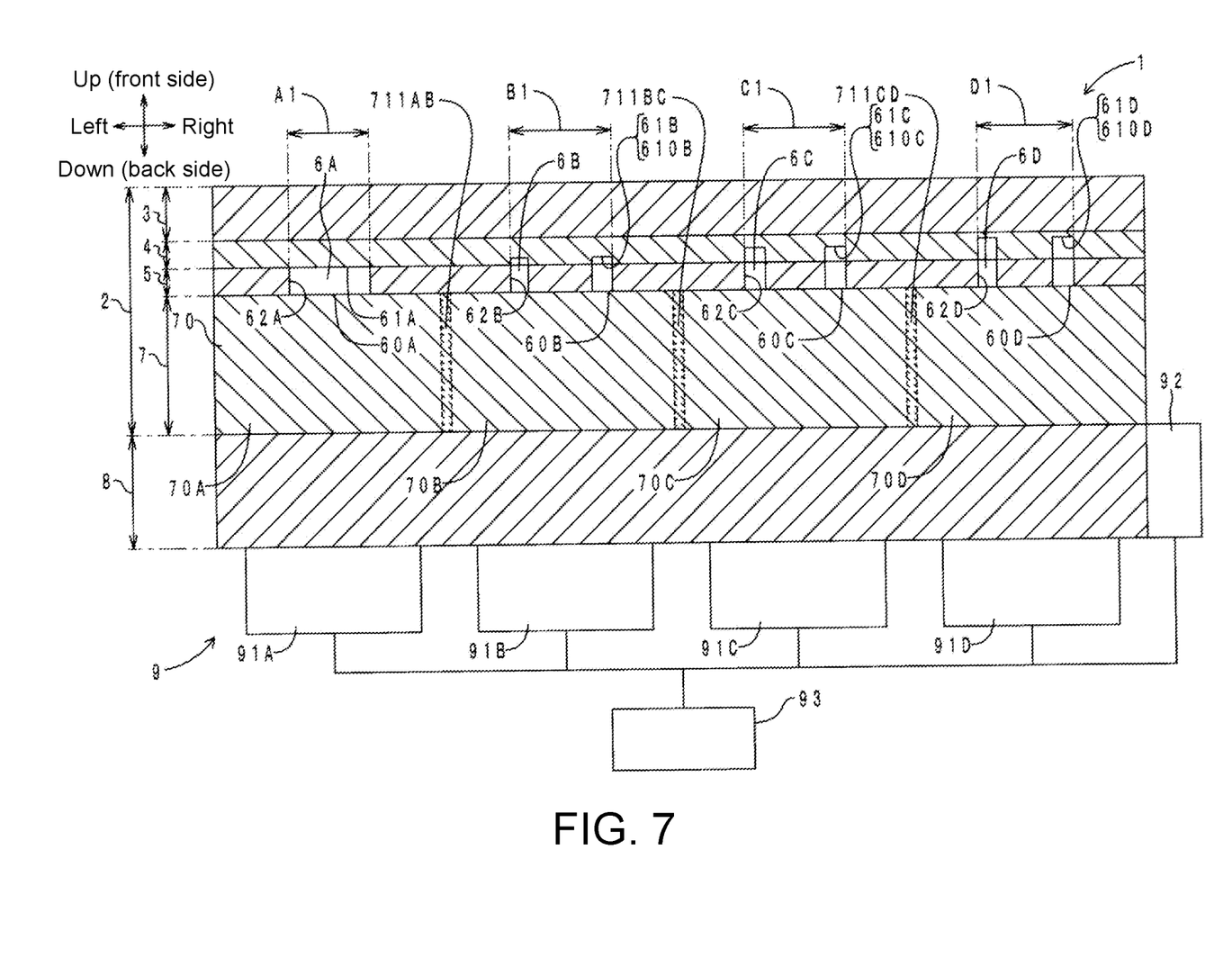
FIG. 7 is a cross-sectional view in the front-back direction of an interior member of a fifth embodiment.

An interior member of the present embodiment differs from the interior member of the second embodiment in that a light source part includes a first light source and a second light source. Here, only the differences will be described. FIG. 7 is a cross-sectional view in the front-back direction of the interior member of the present embodiment. Portions corresponding to those in FIG. 4 are denoted by the same reference numerals.

As shown in FIG. 7, the light source part 9 includes four first light sources (LEDs) 91A to 91D and a single second light source (LED) 92. The first light sources 91A to 91D and the second light source 92 are each able to emit light over the entire surface. The four first light sources 91A to 91D are disposed on the back side of the base material 8. The second light source 92 is disposed on a lateral side (right side; adjacent thereto in the plane direction) of the base material 8.

The base material 8 has a light diffusing property in addition to a light transmitting property and flexibility. Hence, light that has entered the base material 8 from an arbitrary light source (at least one light source among the first light sources 91A to 91D and the second light source 92) is diffused inside the base material 8. Accordingly, an irradiation target of the arbitrary light source is all the display regions A1 to D1.

A usage of the interior member of the present embodiment is described. Table 1 shows lighting patterns of the interior member of the present embodiment. In Table 1, numerical values (0 to 5) in columns of the designs "A" to "D" indicate luminance level. The larger the numerical value, the higher the luminance level.

TABLE 1

| | Lighting pattern | | | | | |
| --- | --- | --- | --- | --- | --- | --- |
| | First light | Second light | Design | | | |
| Illuminance | source | source | A | B | C | D |
| High | Off | Off | 0 | 1 | 2 | 3 |
| Medium | Off | On | 1 | 2 | 3 | 4 |
| Low | On | On | 2 | 3 | 4 | 5 |

The control part 93 acquires illuminance information around the vehicle from an illuminance sensor (not illustrated). As shown in Table 1, the storage device of the control part 93 stores in advance lighting patterns in three stages corresponding to the illuminance (high, medium, and low). The processing device of the control part 93 compares the illuminance information obtained from the illuminance sensor with said lighting patterns, and controls the first light sources 91A to 91D and the second light source 92 to turn on and off.

Specifically, as shown in Table 1 and FIG. 7, in the case where the illuminance obtained from the illuminance sensor is high, all light sources (first light sources 91A to 91D and second light source 92) are turned off. Here, by comparison of the recesses 6A to 6D in terms of depth in the front-back direction, the depth increases in the order of the recess 6A (shallowest)→the recess 6B→the recess 6C→the recess 6D (deepest). Hence, the light transmittance of the display regions A1 to D1 increases in the order of the display region A1 (lowest)→the display region B1→the display region C1→the display region D1 (highest). Accordingly, the luminance level of the designs "A" to "D" displayed on the front surface of the decorative sheet 2 increases in the order of "A" (lowest)→"B"→"C"→"D" (highest).

In the case where the illuminance obtained from the illuminance sensor is about medium, only the second light source 92 is turned on. Hence, compared to the case where the illuminance is high, the luminance level of the designs "A" to "D" increases overall. The luminance level of the designs "A" to "D" increases in the order of "A"→"B"→"C"→"D".

In the case where the illuminance obtained from the illuminance sensor is low, all light sources are turned on. Hence, compared to the case where the illuminance is about medium, the luminance level of the designs "A" to "D" increases overall. The luminance level of the designs "A" to "D" increases in the order of "A"→"B"→"C"→"D".

It is assumed that the designs "A" to "D" are visually recognizable in the case where the luminance level shown in Table 1 is "2" or higher. In this case, if the illuminance is high (for example, during the day), the designs "C" and "D" can be visually recognized by natural light (such as sunlight); if the illuminance is about medium, (for example, in the morning or evening), the designs "B" to "D" can be visually recognized by the light from the second light source 92; if the illuminance is low (for example, at night), the designs "A" to "D" can be visually recognized by the light from the first light sources 91A to 91D and the second light source 92.

The interior member of the present embodiment and the interior member of the first embodiment have similar effects with respect to portions having common configurations. According to the interior member 1 of the present embodiment, a difference is set in the light transmittance between the display regions A1 to D1. In addition, the control part 93 is able to control two types of light sources (first light sources 91A to 91D and second light source 92) to turn on and off according to the illuminance information. Hence, the area or number of designs displayed on the front surface of the decorative sheet 2 can be changed according to the illuminance information.

Sixth Embodiment

Figure 8:
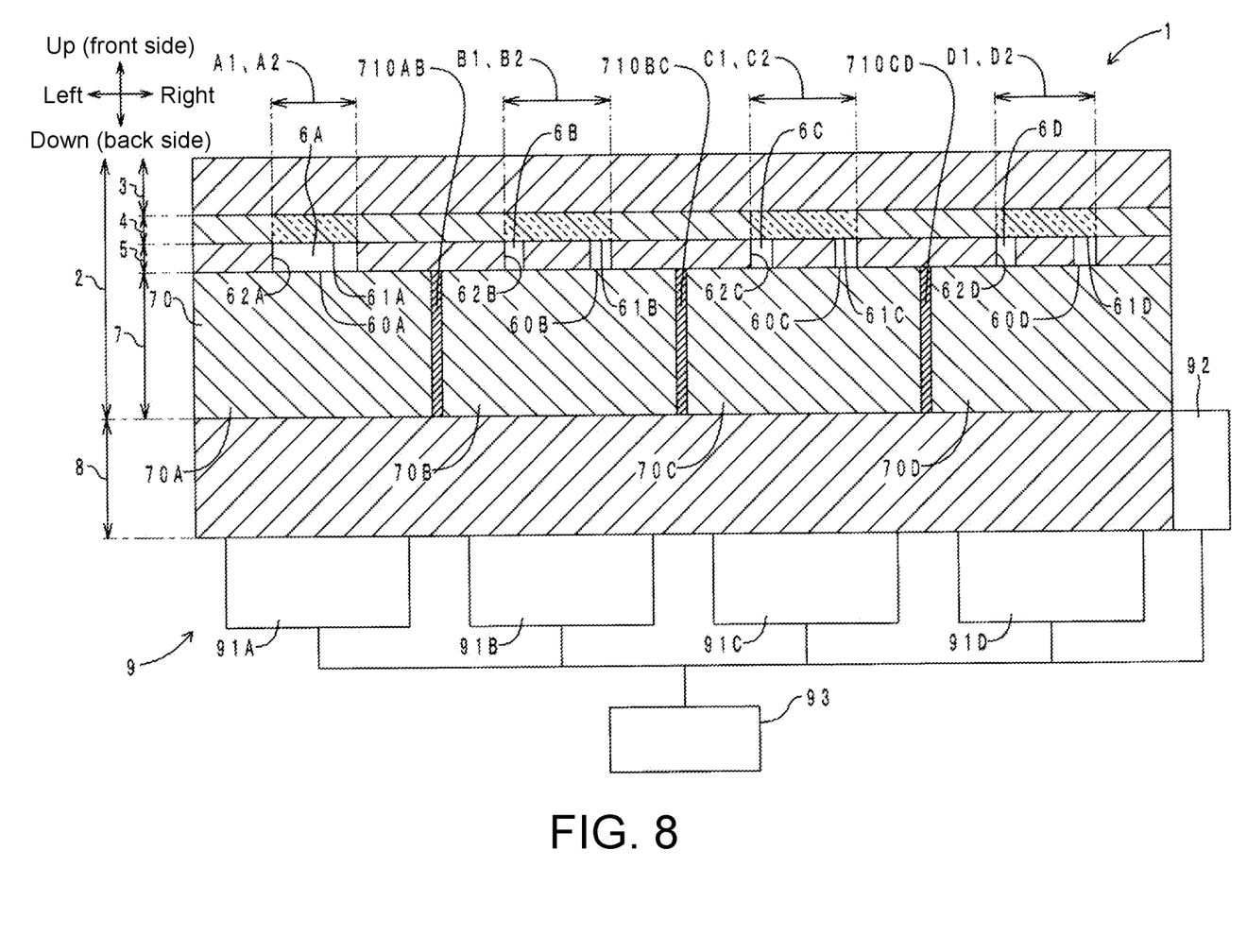
FIG. 8 is a cross-sectional view in the front-back direction of an interior member of a sixth embodiment.

An interior member of the present embodiment differs from the interior member of the first embodiment in that a light source part includes a first light source and a second light source, and that an intermediate layer includes a plurality of intermediate regions. Here, only the differences will be described. FIG. 8 is a cross-sectional view in the front-back direction of the interior member of the present embodiment. Portions corresponding to those in FIG. 3 are denoted by the same reference numerals.

As shown in FIG. 8, the light source part 9 includes four first light sources (LEDs) 91A to 91D and a single second light source (LED) 92. The first light sources 91A to 91D and the second light source 92 are each able to emit light over the entire surface. The four first light sources 91A to 91D are disposed on the back side of the base material 8. The second light source 92 is disposed on the lateral side (right side; adjacent thereto in the plane direction) of the base material 8. A total of five light sources (first light sources 91A to 91D and second light source 92) each have a different light source color.

The base material 8 has a light diffusing property in addition to a light transmitting property and flexibility. Hence, light that has entered the base material 8 from an arbitrary light source (at least one light source among the first light sources 91A to 91D and the second light source 92) is diffused inside the base material 8. Accordingly, an irradiation target of the arbitrary light source is all the display regions A1 to D1.

The intermediate layer 4 is made of light transmitting ink. The intermediate layer 4 includes four intermediate regions A2 to D2. The intermediate regions A2 to D2 are formed by partially changing the ink color of the intermediate layer 4. The intermediate regions A2 to D2 each have a different color. The intermediate regions A2 to D2 and the display regions A1 to D1 face each other in the front-back direction.

The control part 93 acquires time information via the Internet. The storage device of the control part 93 stores in advance a plurality of types of lighting patterns corresponding to time. The processing device of the control part 93 compares the time information obtained from the Internet with said lighting patterns, and controls the first light sources 91A to 91D and the second light source 92 to turn on and off.

The interior member of the present embodiment and the interior member of the first embodiment have similar effects with respect to portions having common configurations. According to the interior member 1 of the present embodiment, the light sources (first light sources 91A to 91D and second light source 92) each have a different light source color. In addition, the intermediate regions A2 to D2 each have a different color. Hence, by controlling turn-on and turn-off by the control part 93, a color of a design displayed on the front surface of the decorative sheet 2 can be changed.

For example, by setting the light source color (light that has entered the base material 8 from an arbitrary (single or multiple) light source) to white and the intermediate region A2 to green, the design "A" on the front surface of the decorative sheet 2 can be made green. By setting the light source color to yellow and the intermediate region B2 to blue, the design "B" on the front surface of the decorative sheet 2 can be made green. By setting the light source color to white and the intermediate region C2 to blue, the design "C" on the front surface of the decorative sheet 2 can be made blue.

By setting the light source color to red and the intermediate region D2 to green, the design "D" on the front surface of the decorative sheet 2 can be made black. That is, by assigning complementary colors to the light source color and the intermediate region color, the design on the front surface of the decorative sheet 2 can be made black. Hence, even if the light source is on, the design can be erased in a pseudo manner or made inconspicuous. By appropriately combining the light source color with the intermediate region color, the design displayed on the front surface of the decorative sheet 2 may be made the same color as said front surface. Even in this case, said design can be erased in a pseudo manner or made inconspicuous.

<Others>

The embodiments of the decorative sheet and the interior member of the present disclosure have been described above. However, embodiments are not particularly limited to the above embodiments. It is also possible to implement various modifications and improvements that can be made by those skilled in the art.

[Regarding Configuration]

Combinations of the display regions A1 to D1, the intermediate regions A2 to D2, the light blocking partition parts (partition plates 710AB to 710CD, paint impregnation partition parts 711AB to 711CD, slits 713AB to 713CD, and spaces 714AB to 714CD) in the decorative sheet 2 are not particularly limited. The display regions A1 to D1, the intermediate regions A2 to D2, and the light blocking partition parts shown in FIG. 3 to FIG. 8 can be used in appropriate combinations.

The number disposed, position, size, shape and so on of the light blocking partition part are not particularly limited. In the soft layer 7 of a single decorative sheet 2, the partition plates 710AB to 710CD, the paint impregnation partition parts 711AB to 711CD, the slits 713AB to 713CD, and the spaces 714AB to 714CD may be disposed in appropriate combinations. A gas that stays in internal spaces of the slits 713AB to 713CD and the spaces 714AB to 714CD is not particularly limited. The gas may be, for example, air or nitrogen.

The partition plate 710AB may provide a complete or partial partition between the block 70A and the block 70B. Even in the case of partial partition (for example, the case where an end on the front side of the block 70A and an end on the front side of the block 70B are locally connected), diffusion of light between the block 70A and the block 70B can be prevented. The same applies to the partition plates 710BC to 710CD and the paint impregnation partition parts 711AB to 711CD.

An extension direction of the partition plate 710AB is not particularly limited. The partition plate 710AB may extend in the front-back direction. The partition plate 710AB may extend in a direction intersecting the front-back direction. The same applies to the partition plates 710BC to 710CD, the paint impregnation partition parts 711AB to 711CD, the slits 713AB to 713CD, and the spaces 714AB to 714CD.

As shown in FIG. 3, in the decorative sheet 2, three partition plates 710AB to 710CD are disposed with respect to four display regions A1 to D1. Two partition plates may be added to said decorative sheet 2. Specifically, two partition plates may be added on the left side (outside in the plane direction) of the block 70A (display region A1) and the right side (outside in the plane direction) of the block 70D (display region D1). In this way, light leakage to the outside from the blocks 70A and 70D, that is, the soft layer 7, can be suppressed. The same applies to the other light blocking partition parts.

The number disposed, position, size, shape and so on of the recesses 6A to 6D are not particularly limited. In the recesses 6A to 6D of a single decorative sheet 2, the intermediate layer reaching parts 610B to 610D, the inclined parts 620A to 620D, the base bottoms 611A to 611D and the deep bottoms 612A to 612D may be disposed in appropriate combinations.

The openings 60A to 60D may be located on the front surface or the back surface of the design layer 5. The bottoms 61A to 61D may be located within the design layer 5 (in the case where the design layer 5 has a light transmitting property), on the back surface of the intermediate layer 4, within the intermediate layer 4, on the front surface of the soft layer 7, or within the soft layer 7. The same applies to the position of the base bottoms 611A to 611D and the deep bottoms 612A to 612D. An inclination angle and an extension direction (inclination direction) of the inclined parts 620A to 620D are not particularly limited.

The number disposed, position, size, shape and so on of the display regions A1 to D1 are not particularly limited. The number of display regions A1 to D1 disposed, the number of designs "A" to "D" disposed to be displayed on the front surface of the decorative sheet 2, and the number of light sources (light sources 90A to 90D, first light sources 91A to 91D, and second light source 92) disposed may be the same or different. A plurality of display regions may be set with respect to a single design. For example, a plurality of display regions in different colors may be set with respect to a single wood grain pattern (design). In contrast, a single display region may be set with respect to a plurality of designs. For example, a single display region in a single color may be set with respect to two letters "A" and "B" (designs). A display region may be set corresponding to light (light source) that is to irradiate said display region. For example, the display region A1 shown in FIG. 3 is set corresponding to the light source 90A that is to irradiate the display region A1.

The number of display regions A1 to D1 disposed and the number of recesses 6A to 6D disposed may be the same or different. For example, a single display region A1 to D1 may be formed by a plurality of recesses 6A to 6D. In contrast, a plurality of display regions A1 to D1 may be formed by a single recess 6A to 6D.

Among the intermediate layer 4, the design layer 5, and the soft layer 7, it is sufficient if the display regions A1 to D1 are disposed in at least the design layer 5 according to the number disposed, position, size, shape and so on of the recesses 6A to 6D. That is, it is sufficient if the design layer 5 includes at least a portion of the display regions A1 to D1.

The type of information used by the control part 93 in controlling a light source (light sources 90A to 90D, first light sources 91A to 91D, and second light source 92) is not particularly limited. Examples of setting information include door opening/closing information, turn-on/turn-off information of lights (such as an interior light or a headlight), user approaching/leaving information, and speed information.

For example, in the case of controlling a light source using the door opening/closing information (information that a door is open or closed), the control part 93 acquires opening/closing information from a door opening/closing sensor, reads a lighting pattern associated with said opening/closing information from the storage device, and controls the light source according to said lighting pattern. Then, a desired display region is irradiated with light.

In the case of controlling a light source using the turn-on/turn-off information of lights (information that the lights are on or off), the control part 93 acquires turn-on/turn-off information from a switch for lights. The subsequent processing is the same as that for the door opening/closing information described above. In the case of controlling a light source using the user approaching/leaving information (information on proximity and separation of a user (such as a finger) with respect to the interior member 1), the control part 93 acquires the user approaching/leaving information from a proximity sensor. The subsequent processing is the same as that for the door opening/closing information described above. In the case of controlling a light source using the speed information (information on speed (including 0 km) of the vehicle), the control part 93 acquires the speed information from a speed sensor. The subsequent processing is the same as that for the door opening/closing information described above.

The position and number of light sources disposed in the light source part 9 are not particularly limited. A single light source may include a plurality of LEDs. In this case, the plurality of LEDs may each have a different color. For example, in the case where the single light source 90A shown in FIG. 3 includes LEDs of three colors, namely red, green, and blue, the display region A1 can be irradiated with white light in addition to red, green, and blue lights.

The design displayed on the front surface of the decorative sheet 2 by the display regions A1 to D1 (recesses 6A to 6D) is not particularly limited. Examples of the design include at least one selected from a pattern (such as polka dot pattern, stripe pattern, lattice pattern, wood grain pattern, or marble pattern), a letter (such as alphabet, hiragana character, katakana character, kanji character, number, or braille character), a shape (such as polygon or circle), and a symbol (such as a button for operating a device, or an icon indicating a device status).

The design displayed on the front surface of the decorative sheet 2 may be in a single color or in multiple colors. It is sufficient if the color or colors are exhibited on the front surface of the decorative sheet 2 by at least one selected from the skin layer 3, the intermediate layer 4, the design layer 5, the soft layer 7, and a light source (light sources 90A to 90D, first light sources 91A to 91D, and second light source 92).

The light transmitting property of the skin layer 3 and the intermediate layer 4 is not particularly limited. The skin layer 3 and the intermediate layer 4 may be colorless transparent, colored transparent, or semitransparent. The intermediate layer 4 may have a gradation in which the color changes from the back surface to the front surface. In this way, the color exhibited on the front surface of the decorative sheet 2 can be changed according to the position of the intermediate layer reaching parts 610B to 610D. The gradation of the intermediate layer 4 may be formed of a plurality of layers. The design layer 5 may or may not have a light non-transmitting property. That is, it is sufficient if the design layer 5 has a lower light transmitting property than the intermediate layer 4. In this case, like the intermediate layer 4, the design layer 5 may have a gradation in which the color changes from the back surface to the front surface. In this way, the color exhibited on the front surface of the decorative sheet 2 can be changed according to the position of the bottoms (only bottoms within the design layer 5) 61A to 61D. The color (hue, saturation, or brightness) of the skin layer 3, the intermediate layer 4, the design layer 5, and the light source (light sources 90A to 90D, first light sources 91A to 91D, and second light source 92) is not particularly limited. The luminance of the light source is not particularly limited.

A sensor having a light transmitting property may be interposed between the design layer 5 and the base material 8 (at least one of between the design layer 5 and the soft layer 7 and between the soft layer 7 and the base material 8). In this way, the decorative sheet 2 can be used as a sensor or a switch. For example, when a proximity sensor (such as a capacitive sensor) is interposed between the design layer 5 and the base material 8, the control part 93 is able to control the light source using said proximity sensor. A timing at which the light source turns on is not particularly limited. The light source may be on all the time. In this case, the control part 93 is unnecessary.

The type, number disposed, and position of the light source are not particularly limited. The light source may be an organic EL sheet, an inorganic EL sheet, a phosphorescent sheet, or the like. The light source part 9 may include a light source and a light guide plate (for example, an acrylic plate).

The interior part in which the interior member 1 is disposed is not particularly limited. Examples thereof include a door trim, a seat, a floor, a ceiling, an instrument panel, a glove box, a steering wheel, a center console, and a register. An installation surface of the interior member 1 in the interior part may be a flat surface or a curved surface. A direction (front-back direction) in which the interior member 1 is installed is not particularly limited. The interior member 1 may be disposed in an interior part of, other than vehicles, a ship, an aircraft, a building, or a house.

A layer configuration of the interior member 1 is not particularly limited. Of the skin layer 3, the intermediate layer 4, the design layer 5, the soft layer 7, and the base material 8, another layer may be interposed between two layers adjacent in the front-back direction. Another layer may be disposed on the front side of the skin layer 3.

[Regarding Material]

The material of the skin layer 3 is not particularly limited. Examples thereof include synthetic leather, resin, elastomers, nonwoven fabrics, and various fabrics (such as woven fabrics and knitted fabrics). Specific examples of synthetic leather, resin, and elastomers include acrylic, polyethylene terephthalate, polycarbonate, polyvinyl chloride, silicone, epoxy, polyurethane, styrene-based thermoplastic elastomers, olefin-based thermoplastic elastomers, and dynamic crosslinking thermoplastic elastomers. Examples of nonwoven fabrics and various fabrics include polyester, polypropylene, nylon, and cotton. The skin layer 3 may contain a coloring agent (such as colored polyethylene), a light diffusing agent (such as silicone, acrylic, and titanium oxide), and a light absorbing agent (such as titanium black and carbon black).

The material of the intermediate layer 4 is not particularly limited. Examples thereof include resin and elastomers, such as acrylic, polyethylene terephthalate, polycarbonate, polyvinyl chloride, silicone, polyester, epoxy, polyurethane, styrene-based thermoplastic elastomers, olefin-based thermoplastic elastomers, and dynamic crosslinking thermoplastic elastomers. The intermediate layer 4 may contain the coloring agent, light diffusing agent, and light absorbing agent described above.

The material of the design layer 5 is not particularly limited. Examples thereof include resin and elastomers, such as acrylic, polyethylene terephthalate, polycarbonate, polyvinyl chloride, silicone, polyester, epoxy, polyurethane, styrene-based thermoplastic elastomers, olefin-based thermoplastic elastomers, and dynamic crosslinking thermoplastic elastomers. The design layer 5 may contain the coloring agent, light diffusing agent, and light absorbing agent described above.

The material of the main body 70 of the soft layer 7 is not particularly limited. Examples thereof include elastomers such as styrene-based thermoplastic elastomers, olefin-based thermoplastic elastomers, and dynamic crosslinking thermoplastic elastomers, and foam such as polyurethane foam. The light blocking paint included in the paint impregnation partition parts 711AB to 711CD is not particularly limited. The light blocking paint may be a white paint (light reflecting paint). The light blocking paint may be a black paint (light absorbing paint). A white paint and a black paint may both be used.

The material of the base material 80 is not particularly limited. Examples thereof include resin and elastomers, such as acrylic, polyethylene terephthalate, polycarbonate, polyvinyl chloride, silicone, polyester, epoxy, polyurethane, styrene-based thermoplastic elastomers, olefin-based thermoplastic elastomers, and dynamic crosslinking thermoplastic elastomers. In order to ensure the shape retention of the interior member 1, it is sufficient if the base material 8 is harder than the other layers (skin layer 3, intermediate layer 4, design layer 5, and soft layer 7).

A member (for example, the base material 8 and the soft layer 7) interposed between a light source (light sources 90A to 90D, first light sources 91A to 91D, or second light source 92) and the display regions A1 to D1 may have a light transmitting property or a light diffusing property. A method for imparting the light diffusing property to these members is not particularly limited. For example, in a transparent base material, a light diffusing agent (such as silicone, acrylic, or titanium oxide) having a different refractive index from the base material may be dispersed. These members may have a light introduction hole (a hole interposed between the light source and the display region and extending in the front-back direction).

A method for laminating the skin layer 3, the intermediate layer 4, and the design layer 5 is not particularly limited. Screen printing, gravure printing, inkjet printing, flexo printing or the like may be used. The layers may be laminated by adhesion, vapor deposition or the like. A method for forming the recesses 6A to 6D with respect to the design layer 5 is not particularly limited. In addition to laser processing, photoetching or the like may be used.

A method for fixing a surface material (laminate of the skin layer 3, the intermediate layer 4, and the design layer 5) and the soft layer 7 is not particularly limited. For example, in the case where the installation surface of the interior member 1 in the interior product (console box 94 shown in FIG. 1) is a convex surface that bulges out to the front side, the soft layer 7 and the surface material outside a radius of curvature of the curve come into pressure contact with the base material 8 inside the radius of curvature. The soft layer 7 and the surface material can be fixed using the pressure contact force. In contrast, in the case where the installation surface of the interior member 1 in the interior product is a concave surface that bulges out to the back side, the pressure contact force described above does not act. In this case, the soft layer 7 and the surface material can be fixed using adhesive, double-sided tape or the like.

The invention claimed is:
1. A decorative sheet comprising:
a skin layer, having a light transmitting property;
an intermediate layer, disposed on a back side of the skin layer and having a lower light transmitting property than the skin layer;
a design layer, disposed on the back side of the intermediate layer and having a lower light transmitting property than the intermediate layer;
a recess, opening on at least one of a front surface and a back surface of the design layer; and
a soft layer, disposed on the back side of the design layer and having a light diffusing property, wherein
the decorative sheet further comprises a plurality of display regions formed by the recess and displaying a predetermined design on a front surface of the skin layer by light irradiated from the back side;
the plurality of display regions are each irradiated with light from the back side via the soft layer;
the soft layer comprises a main body, and a light blocking partition part disposed in the main body and having a higher light blocking property than the main body; and
the light blocking partition part is disposed between two adjacent ones of the plurality of display regions as seen from a front side, and prevents light to be irradiated to one of the plurality of display regions from leaking into the other of the plurality of display regions via the soft layer.

2. The decorative sheet according to claim 1, wherein
the light blocking partition part is a paint impregnation partition part in which a material forming the main body is impregnated with a light blocking paint.

3. The decorative sheet according to claim 1, wherein the light blocking partition part is a slit opening on a back surface of the main body.

4. The decorative sheet according to claim 1, wherein the light blocking partition part is a partition plate buried in the main body.

5. The decorative sheet according to claim 1, wherein among the plurality of display regions, an arbitrary one of the plurality of display regions and another of the plurality of display regions differ in light transmittance.

6. The decorative sheet according to claim 5, wherein the plurality of display regions each have a different light transmittance.

7. The decorative sheet according to claim 5, wherein the recess forming at least some of the plurality of display regions comprises an opening and a bottom, the opening opening on the back surface of the design layer, the bottom facing the opening and comprising an intermediate layer reaching part that is disposed within the intermediate layer.

8. The decorative sheet according to claim 5, wherein the recess forming at least some of the plurality of display regions comprises an opening and a bottom, the opening opening on the back surface of the design layer, the bottom facing the opening; and the bottom comprises a base bottom, and a deep bottom deeper than the base bottom.

9. The decorative sheet according to claim 5, wherein the recess forming at least some of the plurality of display regions comprises an opening, a bottom, and a lateral surface, the opening opening on the back surface of the design layer, the bottom facing the opening, the lateral surface connecting the opening and the bottom; and the lateral surface comprises an inclined part extending in a direction intersecting a plane normal direction of the front surface of the skin layer.

10. An interior member comprising:
the decorative sheet according to claim 1;
a base material, disposed on the back side of the soft layer and having a light transmitting property;
a light source part, irradiating light to the plurality of display regions via the base material and the soft layer; and
a control part, controlling the light source part.

11. The interior member according to claim 10, wherein the base material has a light diffusing property;
the light source part comprises a plurality of first light sources disposed on the back side of the base material, and a second light source disposed on a lateral side of the base material; and
the control part controls the plurality of first light sources and the second light source according to predetermined information.

12. The interior member according to claim 11, wherein the information is any of setting information, time information, and illuminance information.

13. The interior member according to claim 11, wherein the plurality of first light sources each have a different light source color;
the intermediate layer comprises a plurality of intermediate regions facing the plurality of display regions; and
among the plurality of intermediate regions, an arbitrary one of the plurality of intermediate regions differs in color from another of the plurality of intermediate regions.

14. The interior member according to claim 13, wherein the plurality of intermediate regions each have a different color.

* * * * *